United States Patent [19]

McBride

[11] 3,885,631

[45] May 27, 1975

[54] FIRE SUPPRESSING SYSTEM

[76] Inventor: Kenneth L. McBride, Box 855 Taylors, Greenville, S.C. 29687

[22] Filed: Apr. 19, 1974

[21] Appl. No.: 462,547

[52] U.S. Cl. .................................. 169/11; 302/64
[51] Int. Cl. ............................................. A62c 35/36
[58] Field of Search ............... 169/54, 56, 69, 5, 11, 169/26; 302/24, 64

[56] References Cited
UNITED STATES PATENTS

| 1,039,958 | 10/1912 | Kimball | 302/24 X |
| 1,086,964 | 2/1914 | White | 302/24 X |

*Primary Examiner*—M. Henson Wood, Jr.
*Assistant Examiner*—Michael Mar
*Attorney, Agent, or Firm*—Cushman, Darby & Cushman

[57] ABSTRACT

The disclosure embraces a fire suppressing system for enclosed pneumatic conveyors wherein a plurality of gas discharge nozzles are disposed on the interior wall of a conveyor duct or other material handling equipment at preselected points for discharging a fire suffocating gas at high pressure generally axially along the duct and a specially designed baffle is provided extending from the interior wall of the duct and other equipment for each of the nozzles to prevent material that is being passed through the duct and equipment from accumulating on the nozzle, to minimize interference with the flow pattern through the duct or equipment, and to eliminate or greatly minimize the vacuum downstream of the baffle thus avoiding or greatly decreasing the possibility of minute particles accumulating in the zone downstream of the baffle.

8 Claims, 6 Drawing Figures

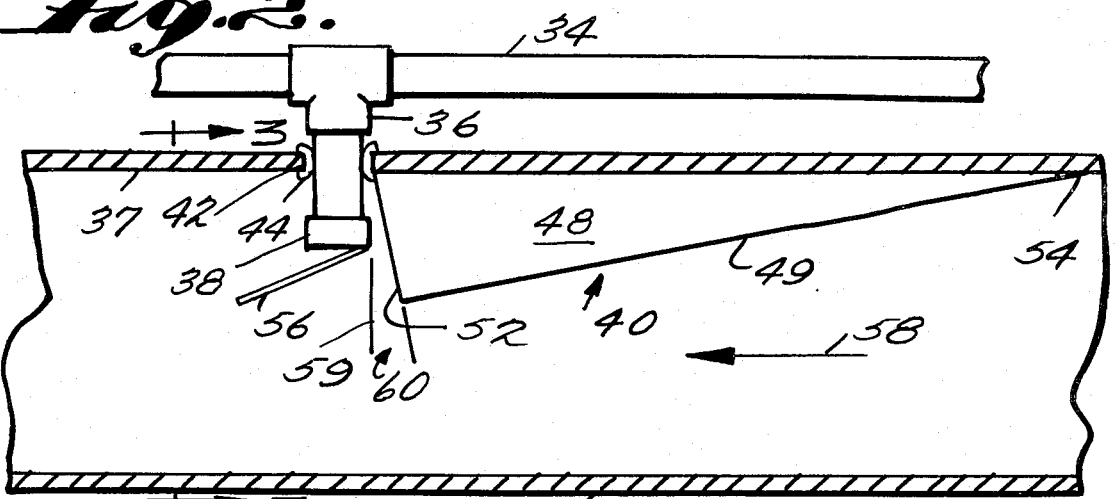
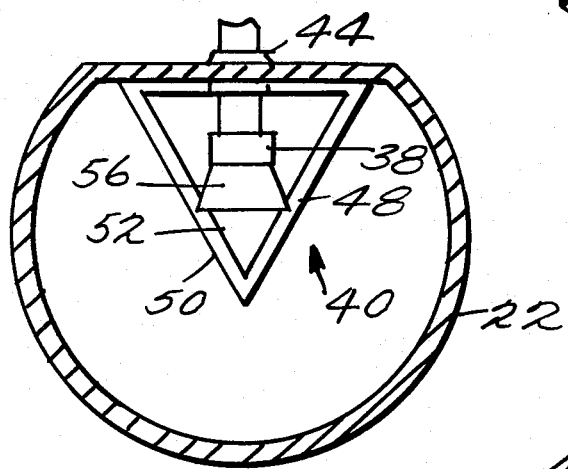
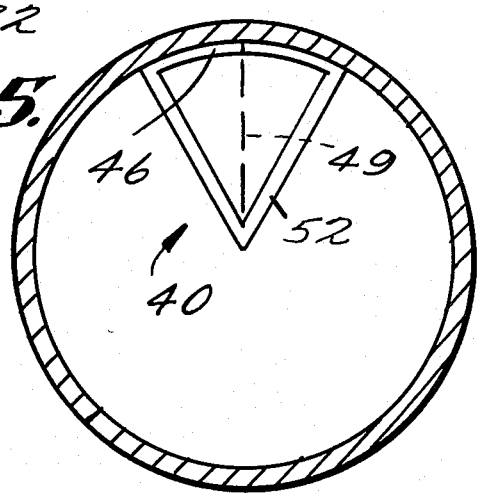
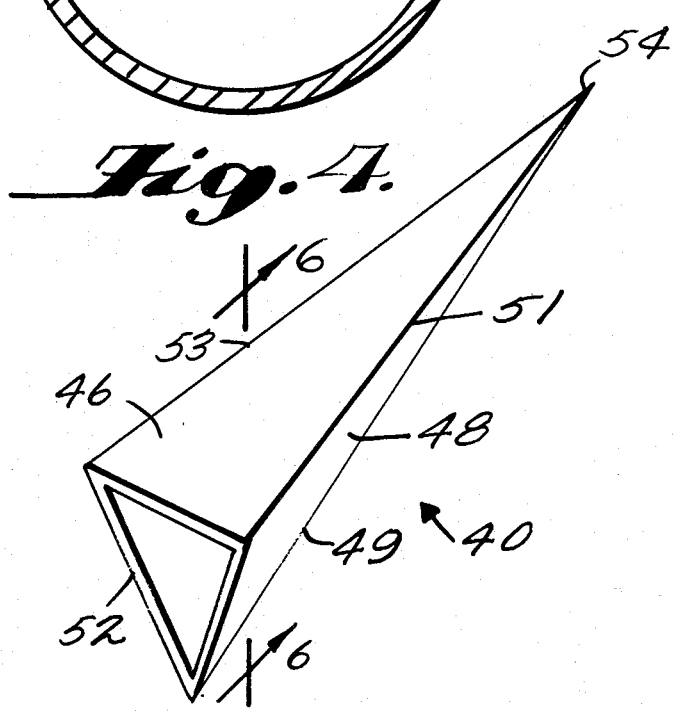
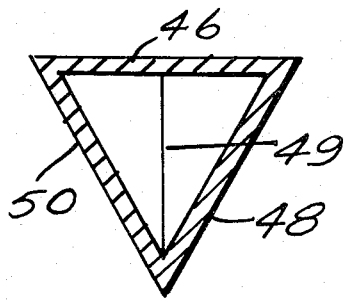

FIRE SUPPRESSING SYSTEM

BACKGROUND AND SUMMARY OF THE INVENTION

The present invention relates to fire suppressing systems for closed material conveyors and transport apparatus and, more particularly, for conveyors of the pneumatic type.

A great number of present day manufacturing plants use closed material transporting devices both for the purpose of preserving the physical integrity of the articles being conveyed through the various manufacturing steps and for the purpose of assuring as safe as possible plant operation where the material being conveyed from work station to work station can be characterized as toxic, flammable or explosive in nature. Additionally, closed conveyor systems of the pneumatic type have proved to be particularly advantageous as they are capable of delivering very accurate quantities of material to various work stations at extremely high speeds and in large volumes. Pneumatic conveyors are of particular usefulness in the chemical plastics industry as well as the textile industry where, in the former, the need for transporting particulate or powdered material and, in the latter, the need for transporting natural or synthetic textile fibers are important considerations in manufacturing efficiency.

As is well known, the usual construction of a pneumatic conveyor consists of a duct system having a series of valves located at appropriate points along the system to either take in or discharge material. In addition, transport of materials through the ducts from point to point is effected by a fluid stream, usually air, which is continuously pumped through the duct system to entrain material injected therein through suitable valve mechanisms and to carry the material by means of the air current to a discharge point.

In what follows, reference will be made to a specific type of pneumatic conveying system utilized in connection with the treatment of raw cotton stock as it is transported from a baler to a textile machine such as a carder. It should be understood, however, that the principles of the present invention have a broader application than in the pneumatic conveying of textile fibers and that the illustrations referred to in the present specification are provided for the purpose of giving context to the numerous problems that have arisen in the use of such closed pneumatic type conveyors in terms of detecting and suppressing fires originating within the system.

More specifically, by way of example, it is known that in the transport of cotton fibers through the duct system of a pneumatic conveyor, static electrical discharges have proved to be the primary source of ignition of fires which, in the case of cotton fibers, can quickly spread throughout a duct system and associated work stations since raw cotton because of its chemical nature will support a fire without the necessity of being exposed to the atmosphere. As will be clear to those skilled in this art, similar problems arise in the pneumatic conveying of certain chemical substances. Another source of incindiary reactions in pneumatic conveyors is believed to result as a consequence of the heat evolved due to frictional contact of the material being conveyed both with itself and the walls of the ducts through which the material passes at extremely high speeds.

Attempts to reduce the incidence of fires arising from the foregoing problems as well as other sources have not proved acceptable because they have been found to be economically unfeasible as is the case with the proposal to provide friction reducing coatings for the interior of the conveying ducts. Other proposals have required a reduction in the volume and throughput speed of the conveying system thus defeating their primary purpose and advantage. In some systems, it has been proposed to use a fire suppressing gas as the conveying fluid but this alternative also is economically unfeasible since the cost of the fire suppressing gas as compared with that of air and the enormous volume of such gas that would be required to render a commercial system operable is prohibitive.

It can be readily appreciated that the primary concerns in suppressing a fire in a closed duct system are that of the time involved in actually putting out the fire as quickly as possible and that of inflicting a minimum amount of damage to the material that is located in the ducts of the system at the time the fire suppression devices are activated. It will be understood, therefore, that important requisites of a successful fire suppression system in a closed ducted conveyor will include the capability if initiating fire suppression steps as rapidly as possible after a fire has been detected and the ability of quickly suppressing the fire throughout the system without damaging or otherwise affecting other material in the conveyor system not actually damaged by the fire.

With the foregoing considerationgs in mind, it can be appreciated that fire suppressing systems that employ dry chemicals, powders, or like materials, in a system such as that shown in U.S. Pat. No. 3,059,901, of Oct. 23, 1962, to suppress fires in closed systems fail to meet the criteria of speed of effectiveness, on the one hand, and, on the other hand, avoiding detrimental effects to the material being conveyed. Indeed, in some systems using chemical powders as fire suppressants such as in a textile fiber plant, the loss of material due to contamination by admixture with the chemical powder can often exceed the losses due to the actual fire itself. In addition, physical damage to the handling equipment and permanent fouling of sensing devices occurs where certain types of powders are used which are also acidic in nature thus tending to corrode all metallic elements of the equipment.

Another proposal suggests a pre-treatment of material which is to undergo transport that will render the material virtually non-inflammable. This approach, however, suffers from the same disadvantage as arises with the use of chemical powders since at least one and more probably two additional handling steps are required to first treat the materials and then subsequently cleanse the material of the protective substance.

In confronting the problems caused by the use of dry chemical powders as a fire suppressing agent, a number of gaseous fire suppressing agents have become available on the market, the use of which has, in general, overcome the difficulties associated with the use of dry chemical powders some of the more useful types of these gaseous agents are carbon dioxide, and bromotrifluoromethane which is sold under the names Halex and Halon, trademarks of the Dupont Company.

The use of fire suppressing gases in closed conveying systems, particularly of the pneumatic type, has, however, engendered certain problems which is the object of the present invention to overcome. More specifically, as will be recognized by those skilled in the art of pneumatic conveyors, the utility of such conveyors can be adversely affected by any unevenness in or obstructions located along the interior walls of the ducts of the system. Additionally, in an ideal pneumatic conveying system, it is desirable to have a uniform cross-section over the entire length of the system to thereby minimize variations in pressure along the axial length of the ducts. Accordingly, where gaseous fire suppressing agents have been resorted to as fire prevention devices in such apparatus, the prior art has proposed various means for injecting the gas into the ducts of the conveyor such as by providing a simple valve outlet flush with the interior surface of the cuct or by providing a flap valve which opens into the duct to thereby permit insertion of a nozzle which, when activated will flush the interior of a duct in the immediate vicinity thereof with the gas suppressing agent. Another arrangement is shown in U.S. Pat. No. 715,219 of Dec. 2, 1902.

The first mentioned of these arrangements suffers from the drawback that the gas, when injected into the duct, is simply projected transverse to the axis of the duct. As a result, little efficient dispersion of the gas along the axis of the duct can be accomplished when the air flow is shut down unless an undesirably large amount of such valves are employed at closely spaced intervals. It will be apparent, therefore, that the related desiderata of low installation costs and speed of effective operation will not be satisfied by such a system.

With respect to arrangements, where, upon detection of a fire, gas nozzles are automatically inserted into a conveying duct with the nozzles being provided with suitable dispersion baffles for distributing the gas axially along the duct, these systems suffer from the inherent drawbacks of cost of installation and maintenance of the associated mechanisms for projecting the nozzle into the duct upon initiation of the fire suppressing activity. In addition, these systems invariably will require shut down of the conveyor system in view of the fact that, once such nozzles are projected into the ducts, some material being transported through the ducts would impinge and accumulate about the nozzles before air flow stops completely upon detection of a fire. Thus, the ducts will become clogged and an extended shut down will be required for clearing of the ducts as well as the nozzles. Additionally, a measureable time delay would exist between the period the fire is detected somewhere in the duct system and the time the nozzles could be placed in position in the ducts and commence discharge of the gaseous fire suppressant.

The present invention provides a gaseous fire suppressing system for enclosed conveyors, particularly of the pneumatic type, which avoids the foregoing drawbacks and yet one which is extremely efficient in operation and which requires very little expenditure of capital to install as compared with the systems of the prior art. More specifically, the present invention provides for a system wherein gas dispensing means, preferably in the form of nozzles, are permanently located on the interior of the ducts of a pneumatic conveying system and associated equipment. The nozzles are preferably provided with conventional deflector plates to direct the flow of gas generally axially along the conveying duct in a downstream direction. An important aspect of the present invention resides in the provision of a particularly shaped shield or baffle means which is permanently mounted in the duct for the purpose, on the one hand, of protecting the gas distribution nozzle from direct impingement thereon by the material being conveyed through the duct and, on the other hand, of assuring substantially unimpeded flow of material through the ducts during normal operation of the conveyor system. As will be explained more fully hereinafter, the novel baffle of the present invention will permit utilization of a wide variety of commercially available gas dispensing nozzles and thus will afford further cost savings by avoiding the necessity of designing and manufacturing unusual nozzle arrangements that would ordinarily be required to meet conditions set by the specific throughput velocities, type of material and type of gas suppressant agent employed in a particular environment. Also, as will be apparent to those skilled in the art, the arrangements of the present invention can be incorporated into an already operative conveyor system or comprise part of the original installation.

In a preferred embodiment, the baffle means of the present invention consists of a three-sided body the shape of which resembles a pyramid. One side of the body is shaped to conform to the interior curvature or surface shape of the duct in which the baffle is to be located. The other two sides or surfaces of the body are generally triangular in axial extent but which taper from a base to a point and which gradually diverge in relation to the downstream direction of the air flow in the duct to the base of the body. Thus, the base of the body will have the appearance of a triangle with the apex thereof pointing towards or coincident with the axis of the duct or flow path where the nozzle is located in a piece of equipment.

In mounting the baffle body of the present invention in a duct of a conveyor, the side opposite the apex of the triangle is suitably secured to the interior wall of a duct with the base of the body closely adjacent to a gas dispensing nozzle which is permanently installed to extend from the interior wall of a conveyor duct. As a result, the gaseous fire suppressing system will, on the one hand, always be ready for immediate activation within the duct system to suppress a fire and yet, on the other hand, will not interfere with material transport through the conveyor system under normal operating conditions.

The foregoing and other advantages will become apparent to those skilled in the art when further consideration is given to the following detailed description and accompanying drawings, in which:

BRIEF DESCRIPTION OF THE DRAWINGS

FIG. 2 is a detailed sectional view of one installation of a nozzle and baffle of the present invention looking transverse to the axis of a conveyor duct;

FIG. 3 is a view taken along lines 3—3 of FIG. 2;

FIG. 4 is a perspective view of the baffle of the present invention;

FIG. 5 is a sectional axial view of a conveying duct having a circular shape with a baffle of the present invention installed therein; and FIG. 6 is a view taken along lines 6—6 of FIG. 4.

DETAILED DESCRIPTION OF THE INVENTION

Figure 1:
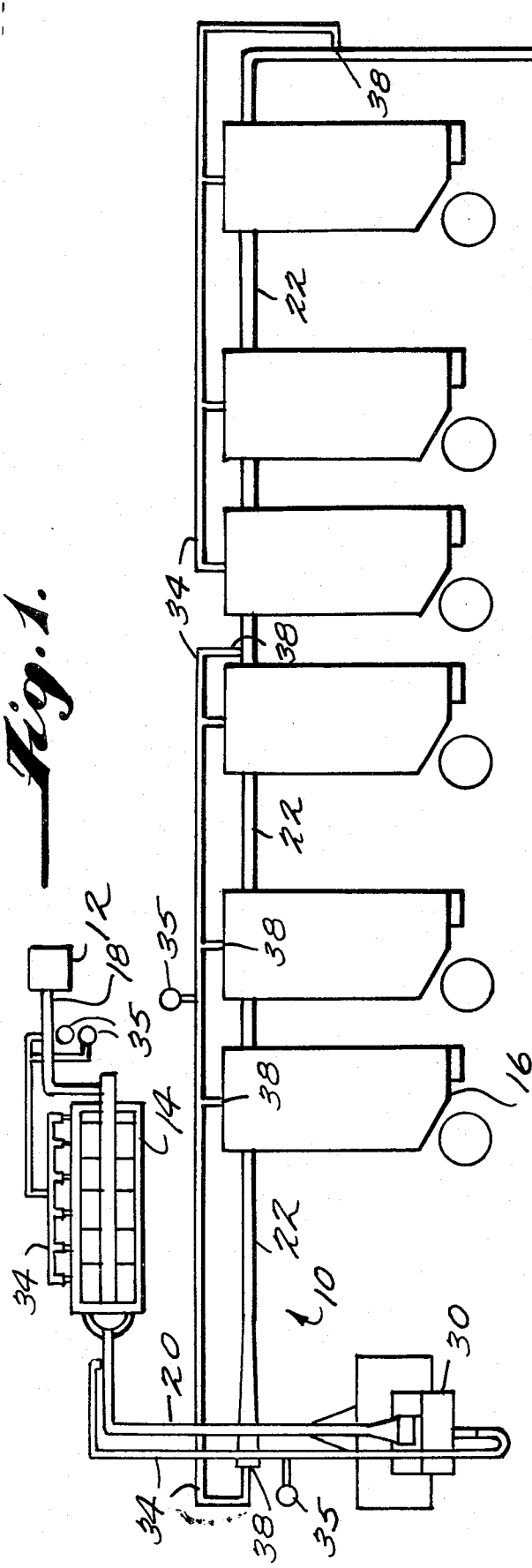
FIG. 1 is a schematic illustration of a pneumatic conveying system employed for transporting textile fibers.
Figure 1:
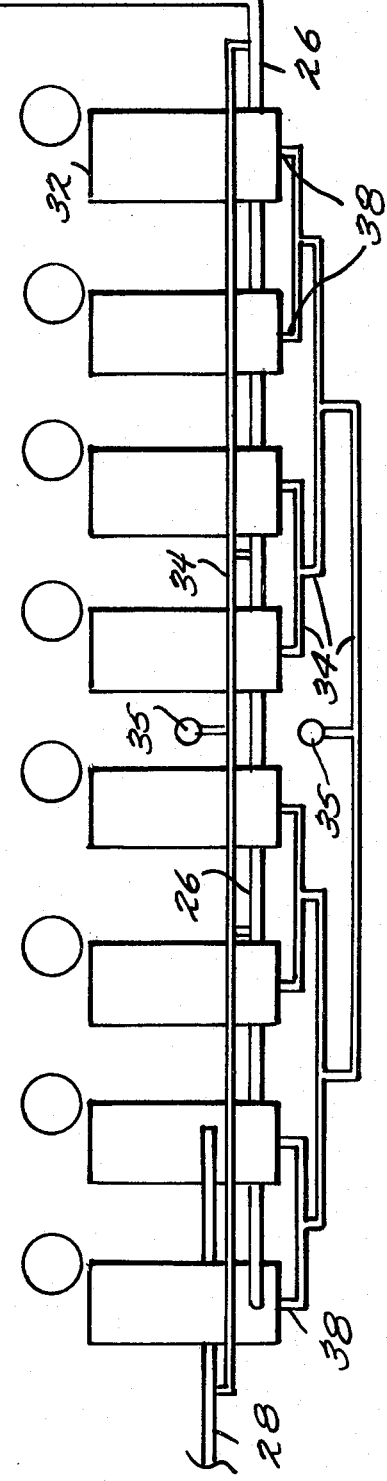

Referring now to the drawings wherein like numerals designate corresponding parts throughout, in FIG. 1 there is illustrated generally at 10 conveying means in the form of a closed, pneumatic conveyor which, by way of example, is shown in conjunction with cotton fiber handling equipment consisting of a source of supply 12, the usual mixing device 14 and treating devices such as carding machines, one of which is indicated at 16.

In the handling of material such as raw cotton stock, bales of cotton are delivered to a baling machine which functions to pull the tightly packed cotton stock apart whereupon the fiber is then introduced into a conventional pneumatic conveyor and delivered to a pretreatment machine such as the mixing device 14. From this device, or devices where a plurality of them are employed in a plant, the conditioned cotton stock is then delivered to a plurality of carding machines which, generally, is the first work station where the cotton undergoes severe physical handling for the purposes of transforming the raw cotton into the desired yarn-like condition. Generally, the practice involves passing the cotton through several carding and twisting operations to, in essence, refine the cotton from its harvested condition to obtain a product suitable for knitting or weaving operations.

From the foregoing, it will be apparent that the efficient operation of such a textile plant will require rapid yet accurately controlled transport of the raw stock from work station to work station in order to keep the large capacity machines installed in such plants adequately supplied with raw material. To this end, pneumatic conveyors are utilized which, as illustrated in FIG. 1, employ a plurality of conveying ducts such as at 18, 20, 22, 24, 26 and 28. In the illustrated example, duct 18 carries by means of an air current induced by fans (not shown) raw cotton from a suitable supply source to the mixer 14. Duct 20 carries the conditioned cotton from the mixer 14 through a second stock conditioner such as a condenser or cleaner 30. Duct 22 then delivers the cotton fibers from the condenser 30 through a first set of carding machines 16. Duct 24 delivers the treated cotton from the condenser or cleaner 30 to duct 26 which, in turn, carries, the cotton stock through another set of carding machines one of which is indicated at 32. Subsequently, duct 28 carries off any excess fibers, if desired, for return to the input of the process.

As thus described, it will be apparent that the efficiency and productivity of the textile handling equipment is intimately related to the efficiency and operability of the pneumatic conveying system 10. Also, it should be understood that all of the transporting of the material and actual textile operations take place in a closed system once the raw cotton stock enters from the source 12 until it is discharged from the system at the end of duct 28 unless further textile operations are contemplated.

As previously noted, the rapid pneumatic conveying and abrasive textile handling of cotton stock results in frequent static electrical discharges particularly where the conveying ducts are made of metal as is the usual case but also even where such ducts are made of high molecular weight plastics. Additionally, such incindiary discharges may occur anywhere throughout the system and could quickly be spread due to the high speed with which the material is passed from machine to machine by means of the pneumatic conveyor system employed.

In attempting to prevent the spread of such fires and also for the purposes of initiating fire suppression steps, highly sensitive detection devices are employed at strategic points of the system. Such devices, which form no part of the present invention, can, upon detection of a fire, provide electrical signals which in turn, can be utilized to shut down the conveying system and, at the same time, activate fire suppression equipment. One such type of detection device operates by detecting any change in the oxygen content of the air flowing through the conveyor ducts and is, therefore, based on the principal that, upon the outbreak of a fire, oxygen will be consumed. Such a change in the state of the air flowing through the duct can be easily detected by sampling devices located at points located throughout the system. Use of infra-red and ionization detectors are also a common practice. The system of the present invention is designed to be compatible with such fire detection devices in that the fire prevention system can almost instantaneously react upon detection of a fire to suppress the fire and thus prevent its spread to other parts of the plant.

In the fire suppressing arrangement contemplated by the present invention, as illustrated in FIG. 1, a plurality of pipes 34 are arranged in generally parallel relationship with the system of ducts. Each pipe 34 is provided with a plurality of T connections 36 (FIG. 2) along its length which, in turn, carry the gas dispensing means in the form of nozzles, some of which are indicated at 38. At suitable intervals, gas tanks 35 are connected to the pipes 34. If desired, each of the nozzles 38 can also serve as a location for the fire sensing devices which is particularly convenient where such devices take the form of air sampling apparatus (not shown).

FIG. 2 illustrates in more detail the mounting of a gas nozzle 38 through the wall 37 of a duct of a conveyor system 10 and the relative disposition of the baffle 40 of the present invention. Nozzle 38 extends through an aperture 42 formed in the wall of the duct and suitable sealing means such as a rubber grommet is provided to seal off the space between aperture 42 and the surface of the nozzle 38 protruding therethrough.

In an already operating pneumatic conveyor system, the baffle body 40 can be placed in position by simply opening the duct at a joint thereof or by cutting through the duct and then by fastening the mounting surface 46 in the position illustrated in FIGS. 2 and 3. Many acrylic and epoxy based adhesives are available which can be used for this purpose.

The baffle body 40 as illustrated in FIGS. 2 – 4, is constructed with three planar side surfaces or walls 46, 48, and 50 and is provided with a base portion 52 which can be open or closed as desired. Preferably, base 52 is flat or planar as illustrated. Side 46 which is the mounting surface, should, of course, be shaped to closely conform to the interior wall of the duct to which the baffle 40 is to be attached. For this purpose it is desireable that the baffle body 40 be constructed from a sturdy plastic material of the synthetic resin type sold under the trademark Plexiglas since this material has the characteristic of being able to be shaped to any desired configuration by suitable well known molding techniques. From the base 52 of the body 40, each of the side surfaces taper uniformly to a point 54. As illustrated, the point 54 in practice is located upstream of the nozzle 38 which the baffle 40 is provided to protect so that the sides 48 and 50 of the baffle 40 will not present an abrupt deflection to material in the air stream but, due to the gradual divergence of the sides 48 and 50 along their common edge 49 in relation to the airstream, only a minimal interference will occur.

As illustrated in FIG. 3, the base 52 of the baffle 40 extends in a plane at an acute angle with a plane extending perpendicularly from the interior wall of duct 22 as does the nozzle 38 which, it should be noted, is provided with the usual deflector plate 56 to disperse the gas emitted by the nozzle in a spray pattern down the axis of the duct. As shown in FIG. 3, the base 52 of the baffle body 40 is slightly larger than the nozzle 38 together with its associated deflector 56 so that the material flowing down the duct 22 in the direction of the arrow 58 as shown in FIG. 2 will be diverted around the nozzle 38 thus preventing any impingement of material conveyed through the ducts on the nozzles provided with the protection of the baffle 40.

Referring again to FIG. 2, the face of base 52 is set at an acute angle with respect to a plane indicated at 59 which plane extends perpendicularly to the interior wall of the duct. This angle of divergence between the base 52 and the imaginary plane 59 is indicated at 60. It has been found that with such an angular relationship of the base 52 and with the sides 48 and 50 of the body 40 diverging in relation to the direction of the airstream the pressure drop that would normally appear downstream of the base 52 is minimized so that the accumulation of minute particles of matter in the vicinity of the nozzle 38 will be substantially reduced. In this regard, the angle 60 should be between 5° and 45° where the diameter of the duct is roughly on the order of 3 to 10 inches.

As illustrated in FIG. 5, the mounting side 46 of the body 40 is here shaped to conform to the interior shape of the surface of the duct. This can be readily accomplished since, as previously noted, the material from which the baffle 40 is constructed is preferably of synthetic resins or metals which can be shaped to the desired configuration. Thus, where it is necessary to locate a nozzle 38 at a severe bend in the duct system, the baffle 40 can be suitably shaped to conform to the bend so long as the disposition of the base 52 immediately adjacent to the nozzle 38 is retained. As a result, the necessity and expense of designing recesses in the walls of the ducts of the pneumatic conveying system can be entirely avoided.

In some arrangements, particularly where the baffles 40 and nozzle dispensing system of the present invention are installed as part of the original equipment of a pneumatic conveying system, the use of a closed side 46 may be eliminated since the edges 51 and 53 remote from their common edge 49 of the sides 48 and 50 can be directly secured in a rigid manner to the interior wall of a duct whereas, with an already operating system, attachment of the side 46 can be effected more easily and will assure the necessary structural rigidity to the sides 48 and 50 depending therefrom.

Dispensing of the fire suppressing gas through the nozzles can, of course, be effected in a number of ways such as by actuation of a valve at each gas tank by an electrical current to a solenoid, the current being regulated by the fire sensing devices.

While the foregoing has been a description of a preferred embodiment of the arrangement of the present invention, it will be understood that various modifications may be made therein within the spirit and scope of the invention as defined in the appended claims.

What is claimed is:

1. In a material conveying system of the pneumatic type having hollow duct means for conveying material by means of a fluid current therethrough, fire suppressing means including a plurality of dispensing means for a fire suppressing gas each disposed at spaced-apart locations within said duct means, a plurality of baffle means for deflecting material being conveyed through said duct means around a said gas dispensing means, each of said baffle means including a base portion, a said baffle means being securely mounted on the interior of said duct means with said base portion disposed immediately upstream of a said gas dispensing means, each of said baffle means having surfaces extending from said base portion in an upstream direction with said surfaces converging substantially at a point.

2. The invention as claimed in claim 1 wherein said conveying system is arranged to transport material through material handling equipment and said equipment is provided with said gas dispensing means and said baffle means for deflecting material being passed through said equipment around said gas dispensing means.

3. The invention as claimed in claim 1 wherein said baffle means includes two planar surfaces each having a common edge and edges remote from said common edge, said planar surfaces being disposed with said edges remote from said common edge extending from said base portion to converge with said common edge at said point, said point lying on said interior surface of said duct means.

4. The invention as claimed in claim 1 wherein said baffle means has three side surfaces defining a body that tapers from said base to said point, said duct means having an interior surface, one of said side surfaces being secured to said interior surface of said duct means.

5. The invention as claimed in claim 4 wherein said surface of said body that is secured to said interior surface of said duct means is shaped to conform to the shape of said interior surface of said duct means.

6. The invention as claimed in claim 1 wherein said base portion lies substantially in a plane and said duct means has an interior surface, said plane of said base portion intersecting said interior surface of said duct means at an acute angle with a plane extending perpendicularly to said interior surface.

7. The invention as claimed in claim 1 wherein said plurality of dispensing means for the fire suppressing gas comprises a plurality of gas nozzles, said duct means including a wall having apertures therethrough at spaced-apart locations, each of said apertures having a said nozzle extending therethrough into the interior of said duct means.

8. In a material conveying system of the pneumatic type having hollow ducts for conveying material by means of a fluid current therethrough, fire suppressing means including a plurality of fire suppressing gas nozzles, said ducts having interior walls having apertures, each of said apertures having a said nozzle extending therethrough into the interior of said ducts, baffle means for deflecting material conveyed through said ducts around said gas dispensing nozzles, each of said baffle means including a base portion, three planar side surfaces joined along their edges to define a body, said body tapering from said base portion to a point, one of said side surfaces being securely attached to the interior surface of a said duct with said base portion located immediately upstream of a said nozzle, said base portion lying substantially in a plane, and said plane of said base portion intersecting said interior surface of said ducts at an acute angle with a plane extending perpendicular to said interior surface of said duct.

* * * * *